(12) United States Patent
El Fassi (10) Patent No.: US 9,764,749 B2
(45) Date of Patent: Sep. 19, 2017

(54) METHOD FOR COMMUNICATING INFORMATION BETWEEN AN ON-BOARD CONTROL UNIT AND A PUBLIC TRANSPORT NETWORK

(75) Inventor: Said El Fassi, Vigneux sur Seine (FR)

(73) Assignee: Siemens S.A.S., St. Denis (FR)

(*) Notice: Subject to any disclaimer, the term of this patent is extended or adjusted under 35 U.S.C. 154(b) by 117 days.

(21) Appl. No.: 13/992,872

(22) PCT Filed: Sep. 15, 2011

(86) PCT No.: PCT/EP2011/066040
§ 371 (c)(1),
(2), (4) Date: Jul. 8, 2013

(87) PCT Pub. No.: WO2012/076206
PCT Pub. Date: Jun. 14, 2012

(65) Prior Publication Data
US 2013/0325211 A1   Dec. 5, 2013

(30) Foreign Application Priority Data

Dec. 9, 2010   (EP) .................................... 10290643

(51) Int. Cl.
*G05D 1/00*   (2006.01)
*G05D 3/00*   (2006.01)
(Continued)

(52) U.S. Cl.
CPC .............. *B61L 27/04* (2013.01); *B61L 11/08* (2013.01); *B61L 13/04* (2013.01); *B61L 15/0027* (2013.01); *B61L 23/26* (2013.01)

(58) Field of Classification Search
CPC .......... B61L 11/08; B61L 13/04; B61L 27/04; B61L 23/26; B61L 15/0027
(Continued)

(56) References Cited

U.S. PATENT DOCUMENTS 4,041,470 A * 8/1977 Slane et al. ................... 701/29.1
4,344,364 A * 8/1982 Nickles et al. .............. 105/62.1
(Continued)

FOREIGN PATENT DOCUMENTS

| EP | 1147966 A1 | 10/2001 |
| EP | 1695890 A1 | 8/2006 |
| WO | 2011084251 A2 | 7/2011 |

OTHER PUBLICATIONS

Arms, Jan Christian, "Decentralised intelligence for control and protection systems—A prerequisite for radio-based operating concepts; Dezentrale Intelligenz für Leit-und Sicherungstechnik—Voraussetzung für funkbasierte Betriebskonzepte" XP009067244; Eisenbahengenieur, 1997, vol. 48, No. 6, pp. 12-16.

*Primary Examiner* — Calvin Cheung
*Assistant Examiner* — Paula L Schneider
(74) *Attorney, Agent, or Firm* — Laurence Greenberg; Werner Stemer; Ralph Locher (57) ABSTRACT

A method is provided for communicating at least one item of information between a first control unit on-board a first vehicle and a public transport network. The information is sent as a command from the first control unit to a first communication unit on board the first vehicle. The first communication unit establishes a transmission link outside the vehicle with a second communication unit connected to a module for executing the command. The second communication unit and the execution module are located on the ground. The first control unit controls the execution module on the ground in a governed slave mode for the command by a master mode of the first control unit.

20 Claims, 4 Drawing Sheets

(51) Int. Cl.
*G06F 7/00* (2006.01)
*G06F 17/00* (2006.01)
*B61L 27/04* (2006.01)
*B61L 11/08* (2006.01)
*B61L 13/04* (2006.01)
*B61L 15/00* (2006.01)
*B61L 23/26* (2006.01)

(58) Field of Classification Search
USPC .................................................. 701/2
See application file for complete search history.

(56) References Cited

U.S. PATENT DOCUMENTS

| | | | | |
|---|---|---|---|---|
| 4,652,057 | A * | 3/1987 | Engle et al. | 303/3 |
| 5,053,964 | A * | 10/1991 | Mister et al. | 701/19 |
| 5,265,832 | A * | 11/1993 | Wesling et al. | 246/169 R |
| 5,289,176 | A * | 2/1994 | Novakovich et al. | 370/254 |
| 5,293,632 | A * | 3/1994 | Novakovich et al. | 713/324 |
| 5,317,751 | A * | 5/1994 | Novakovich et al. | 713/323 |
| 5,340,062 | A * | 8/1994 | Heggestad | 246/5 |
| 5,353,413 | A * | 10/1994 | Novakovich et al. | 710/110 |
| 5,364,047 | A * | 11/1994 | Petit et al. | 246/122 R |
| 5,404,465 | A * | 4/1995 | Novakovich et al. | 710/110 |
| 5,420,883 | A * | 5/1995 | Swensen et al. | 375/138 |
| 5,475,818 | A * | 12/1995 | Molyneaux et al. | 709/208 |
| 5,487,516 | A * | 1/1996 | Murata et al. | 246/182 C |
| 5,533,695 | A * | 7/1996 | Heggestad et al. | 246/62 |
| 5,570,284 | A * | 10/1996 | Roselli et al. | 701/2 |
| 5,623,413 | A | 4/1997 | Matheson et al. | 701/117 |
| 5,803,411 | A * | 9/1998 | Ackerman et al. | 246/169 R |
| 5,936,517 | A * | 8/1999 | Yeh | 340/435 |
| 5,947,423 | A * | 9/1999 | Clifton | B61L 3/225 |
| | | | | 246/167 R |
| 5,950,967 | A * | 9/1999 | Montgomery | 246/182 R |
| 5,974,081 | A * | 10/1999 | Rosas | H04B 1/713 |
| | | | | 375/133 |
| 6,135,396 | A * | 10/2000 | Whitfield et al. | 246/182 R |
| 6,370,452 | B1 * | 4/2002 | Pfister | 701/23 |
| 6,421,600 | B1 * | 7/2002 | Ross | 701/117 |
| 6,853,888 | B2 * | 2/2005 | Kane et al. | 701/19 |
| 6,863,246 | B2 * | 3/2005 | Kane et al. | 246/121 |
| 7,206,676 | B2 * | 4/2007 | Cross et al. | 701/19 |
| 7,263,415 | B2 * | 8/2007 | Mindel | 701/19 |
| 7,756,613 | B2 | 7/2010 | Katsuta et al. | |
| 8,229,604 | B2 * | 7/2012 | Villaume et al. | 701/3 |
| 8,428,798 | B2 * | 4/2013 | Kull | 701/19 |
| 8,536,997 | B2 * | 9/2013 | De Sanzo | 340/468 |
| 8,538,608 | B2 * | 9/2013 | Meltser et al. | 701/19 |
| 8,630,757 | B2 * | 1/2014 | Daum et al. | 701/19 |
| 8,914,167 | B2 * | 12/2014 | Smith | 701/19 |
| 2002/0049520 | A1 * | 4/2002 | Mays | 701/19 |
| 2002/0091483 | A1 * | 7/2002 | Douet | B61L 23/34 |
| | | | | 701/408 |
| 2002/0152008 | A1 * | 10/2002 | Horst et al. | 701/2 |
| 2003/0034423 | A1 * | 2/2003 | Hess et al. | 246/167 R |
| 2003/0083791 | A1 * | 5/2003 | Szklar et al. | 701/2 |
| 2003/0200025 | A1 * | 10/2003 | Ross | 701/200 |
| 2003/0214417 | A1 * | 11/2003 | Peltz et al. | 340/825 |
| 2003/0222180 | A1 * | 12/2003 | Hart et al. | 246/167 R |
| 2004/0049343 | A1 * | 3/2004 | Yamadaji et al. | 701/301 |
| 2004/0104312 | A1 * | 6/2004 | Hess et al. | 246/186 |
| 2004/0124315 | A1 * | 7/2004 | Kane et al. | 246/111 |
| 2004/0162670 | A1 * | 8/2004 | Brown et al. | 701/209 |
| 2005/0102903 | A1 * | 5/2005 | Takahashi | 49/28 |
| 2006/0074544 | A1 * | 4/2006 | Morariu et al. | 701/117 |
| 2006/0155434 | A1 * | 7/2006 | Kane et al. | 701/19 |
| 2008/0119965 | A1 * | 5/2008 | McCrary | 701/2 |
| 2009/0299552 | A1 * | 12/2009 | Villaume et al. | 701/3 |
| 2010/0090069 | A1 * | 4/2010 | Degouge et al. | 246/3 |
| 2011/0060486 | A1 * | 3/2011 | Meltser | B61C 17/12 |
| | | | | 701/19 |
| 2011/0075641 | A1 * | 3/2011 | Siriwongpairat et al. | 370/337 |
| 2011/0118899 | A1 * | 5/2011 | Brooks et al. | 701/2 |
| 2011/0172856 | A1 * | 7/2011 | Kull | 701/19 |
| 2012/0038474 | A1 * | 2/2012 | De Sanzo | 340/468 |
| 2012/0206243 | A1 * | 8/2012 | Butler et al. | 340/10.51 |

* cited by examiner

METHOD FOR COMMUNICATING INFORMATION BETWEEN AN ON-BOARD CONTROL UNIT AND A PUBLIC TRANSPORT NETWORK

BACKGROUND OF THE INVENTION

Field of the Invention

The present invention relates primarily to a method for communicating at least one piece of information between a first control unit on-board a first vehicle and a public transport network, as claimed.

Existing methods of communication between on-board equipment in a first public transport vehicle (train or units thereof, metro, tram, trolley bus, bus, etc.) and a physical public transport network (equipment on the ground and on board other vehicles) offer significant performance that in particular enables rapid, safe commands to be generated, such as using communication-based train control (CBTC), which is well suited to self-guided vehicles (such as driverless vehicles). For this purpose, most control units are located in ground infrastructure so that information can be sent in the form of commands to the vehicles or to other ground equipment, such as switches or signal lights on the ground.

According to this logic, when initially designing or updating/overhauling public transport infrastructure, the control information needs to be centralized on the ground in at least one central control station (or several control centers, which must be in communication with one another), but it is also necessary to distribute (or redistribute) the information sent from these control units on the ground over the entire public transport network to the receiver modules (or transmission modules, where applicable) of each vehicle or the ground equipment. This type of work is complex because it involves multiple costly operations (trackside installations for cable connections, installation of wireless radio points such as access points distributed along the tracks and forming a ground network, etc.).

BRIEF SUMMARY OF THE INVENTION

One object of the present invention is to propose a method for communicating at least one piece of information between a first control unit on board a first vehicle and a public transport network (including equipment on the ground and on board any other vehicle) with a view to minimizing the complexity of said public transport network, both in terms of the physical infrastructure thereof (trackside, cabling) and the communication aspect thereof (wired equipment, equipment rooms).

On the basis of a method for communicating at least one piece of information between a first control unit on-board a first vehicle and a public transport network, the invention provides for the following:

- the information is sent by the first control unit in the form of a command, said command being transferred to a first communication unit on board the first vehicle,
- the first communication unit establishes a transmission link outside the vehicle with a second communication unit linked to a module for executing said command, the second communication unit and the execution module being located either on the ground or on board a second vehicle comprising a second control unit,
- in the event of a transmission to the second communication unit on the ground, the execution module on the ground is controlled in a directly governed slave mode for said command by a master mode of the first control unit.

Then, ideally if not detectable independently by the first control unit, a confirmation of the execution state of the execution module on the ground is sent back to the first control unit, said out and in transmissions using no communication infrastructure on the ground, in the event of a transmission to the second on-board communication unit, the execution module on board the second vehicle is controlled in a directly governed slave mode to permit said command to be executed in a master mode of the first control unit (CU1), thereby at least temporarily placing a second control unit on board the second vehicle in a slave mode to execute said command. Then, ideally, a confirmation of the execution state of the on-board execution module is sent to the first control unit, said out and in transmissions using no communication infrastructure on the ground. It is also possible for said command to be executed directly by controlling the second vehicle, in that the slave mode of the second control unit is finally switched (back) to master mode to execute said command independently. Alternatively (in particular in the event of a disabling outage of the first vehicle or the control unit thereof), if this confirmation involves a degraded mode between the control units of the first and second vehicles, an execution module (EXE1) on board the first vehicle is controlled in a switched-back slave mode directly governed by a master mode of the second control unit, thereby at least temporarily placing the first control unit (CU1) on board the first vehicle in a slave mode to execute said command. Such alternation of the master/slave modes of the two control units continues until the initial command expires under at least safe conditions.

More specifically, the initially master mode of the first on-board control unit is permitted thanks to an "intelligent" predisposition, in which as much information and as many methods for managing a public transport network as possible have been stored in said unit before operation of said network (and by extension in all of the control units on board all of the vehicles). In other words and unlike the prior art in which such information and related "intelligent" control methods are mostly located in "master" equipment for managing the network/traffic on the ground, resending them to on-board and ground equipment, the method according to the present invention remotely locates the "master" function into the on-board control units, thereby enabling said units to directly govern, in a master mode, other ground or on-board equipment without having to transmit information via the network management equipment on the ground. The benefit of using the method according to the invention is primarily that, when undertaking installation or updating work (extension or replacement of a railway network), all of the complex work required to arrange control installations on the ground to manage traffic can be avoided, or at least greatly simplified. The construction costs incurred are therefore greatly reduced and the environment is safeguarded, since it does not need to be changed to install the control equipment or to roll out a communication network along the tracks.

A set of sub-claims also sets out advantages of the method according to the invention, as well as the advantages of using said method.

In particular and in the event of a transmission to the second communication unit on the ground, the method according to the invention provides for the command issued directly from the first on-board control unit to govern at least one of the following advantageous actions:

opening the platform doors, ideally in synchronization with the vehicle doors; this avoids any risk of a loss of synchronization between the control modules of the two PLCs (on-board and platform) for opening/closing the two door systems.

interlocking and movement of switches is directly possible in one or more master modes of neighboring vehicles, without having to obtain a ground traffic management equipment authorization command, or interlocking managed on the ground;

luminous or mechanical signaling on the ground can also be controlled in master mode of an on-board control unit since the unit has "intelligent" information previously stored safely; even in the case of a plurality of vehicles, each of the control units thereof is able to govern itself by establishing a hierarchy, such as first master, second master as sub-master and slave for three vehicles in the vicinity of said signal. According to this system, it is also possible to cyclically shift this hierarchy between the three vehicles to estimate which is most suited (securely the cheapest or quickest in terms of essential traffic management) in order to optimize signal control;

storage of instantaneous information in a communication terminal on the ground transmitted by the first vehicle, said information being ideally readable by all vehicles approaching it; this helps to facilitate traffic data exchanges between distant vehicles without the need for complex ground network points.

a diagnostic transmission to request a service on the ground, such as a power supply, a maintenance stage or an emergency; this transmission may occur at a communication terminal centralizing said diagnosis, for example at a station with an energy storage unit that, once directly requested in master mode of the vehicle, charges the vehicle in consideration of the range requirements thereof and the requirements of the remainder of the public transport network;

sending an alert signal; this alert can thus be communicated by forcing other ground and on-board (mobile) control units to work into preventive "slave" modes to work around or resolve the alert according to the vehicle control safety plans;

a functional status message for the on-board and/or ground equipment; etc.

Equally and in the event of a transmission to the second on-board communication unit, the method according to the invention provides for the command issued directly from the first control unit to govern at least one of the following actions:

an information exchange of the following types CBTC (communication based train control), ATC (automatic train control), IXL (interlocking), ATP (automatic train protection), ATO (automatic train operation) in particular suited to self-guided vehicles;

an information exchange enabling the pilot on board the first vehicle or a driver to automatically or manually drive the second vehicle;

an independent movement authority of the first and second vehicle;

a preventive collision-prevention instruction, for example switching the master/slave modes of the two control units in direct communication, or of at least one control unit usually piloted by a collision-prevention device (distance sensor, "safe eye" camera, etc.);

a vehicle approach or coupling instruction using the same principle as the collision-prevention instruction;

a splitting instruction for a vehicle made up of a plurality of rolling-stock units using the inverse principle of the approach/coupling instruction;

an inter-vehicle information transmission for each vehicle using various parameters such as position, speed, energy levels, braking capacity, instantaneous and anticipated routes; this information in particular makes it possible for each on-board control unit to prioritize the master or slave mode depending on the objectives and requirements of each vehicle;

a forced protective switching from master mode to slave mode of one of the control units or any other fault detected that contravenes safety standards, in which case another of the on-board control units can then be set to master mode to make up for the fault, for example by remotely controlling the equipment on board the vehicle including the control unit in slave mode;

a forced protective switching from master mode to slave mode of one of the control units or any other fault detected that contravene safety standards, and the remote control of the equipment on board the vehicle including the control unit in slave mode from a ground network pilot;

The method according to the invention also provides for at least one of the vehicles authorizing a switching of a control unit on the ground to master mode in order to send parameters related to the network, resources, planning and public transport equipment to an on-board control unit. This method makes it possible to simply and centrally update and supplement the "intelligent" data from a single ground interface to the vehicles or to other ground equipment by means of vehicles scheduled to approach them and to send/impose this data to/on them in a slave mode of the equipment on the ground ordered by a master mode of the control unit of the vehicle. Thus, in this case the information is advantageously sent in a mobile manner using the on-board control unit without having to use a complex/costly communications network on the ground.

The method according to the invention is particularly well adapted for the use of radio links applied to information communication between equipment on a first vehicle and ground or on-board equipment away from the first vehicle. This means that there are no cabled, wired or contact links, even for a link between equipment in a station (for example doors) and vehicle equipment.

Finally, the method according to the invention is particularly beneficial when installing, updating or commissioning a physical public transport network and a related communications network, in particular by maximizing, in a first phase, an initial supply of data that can be stored in the on-board control units by the vehicles in order, in a second phase, to minimize or eliminate the quantity of data transmission means, information and commands from communication infrastructure on the ground to said vehicles, said data thus stored and carried on board being used to generate the information in the form of commands. In other words, a public transport network no longer needs two trackside communication-network levels (ground and on-board), but just one network to enable inter-vehicle communication and communication with the equipment on the ground. In other words and according to a preferred embodiment of the invention, the method according to the invention can be used, at least under secure conditions confirmed from the on-board equipment, without transmitting data, information or commands from the communication infrastructure on the ground to said on-board equipment.

Finally, the method according to the invention provides for the data used to generate the information in the form of specific commands, identical and additional to the data stored and carried on board, to be provided by the on-board sensory equipment, such as an optical sensor, a camera, a distance measurement sensor, an RFID reader and any other sensor. In this way, one or more vehicles are made increasingly independent and the switching between master/slave mode is managed according to enhanced security priorities, while simplifying communication of the information on the "intelligent" on-board network.

Exemplary embodiments and applications are provided using the figures described:

DESCRIPTION OF THE INVENTION

Figure 1:
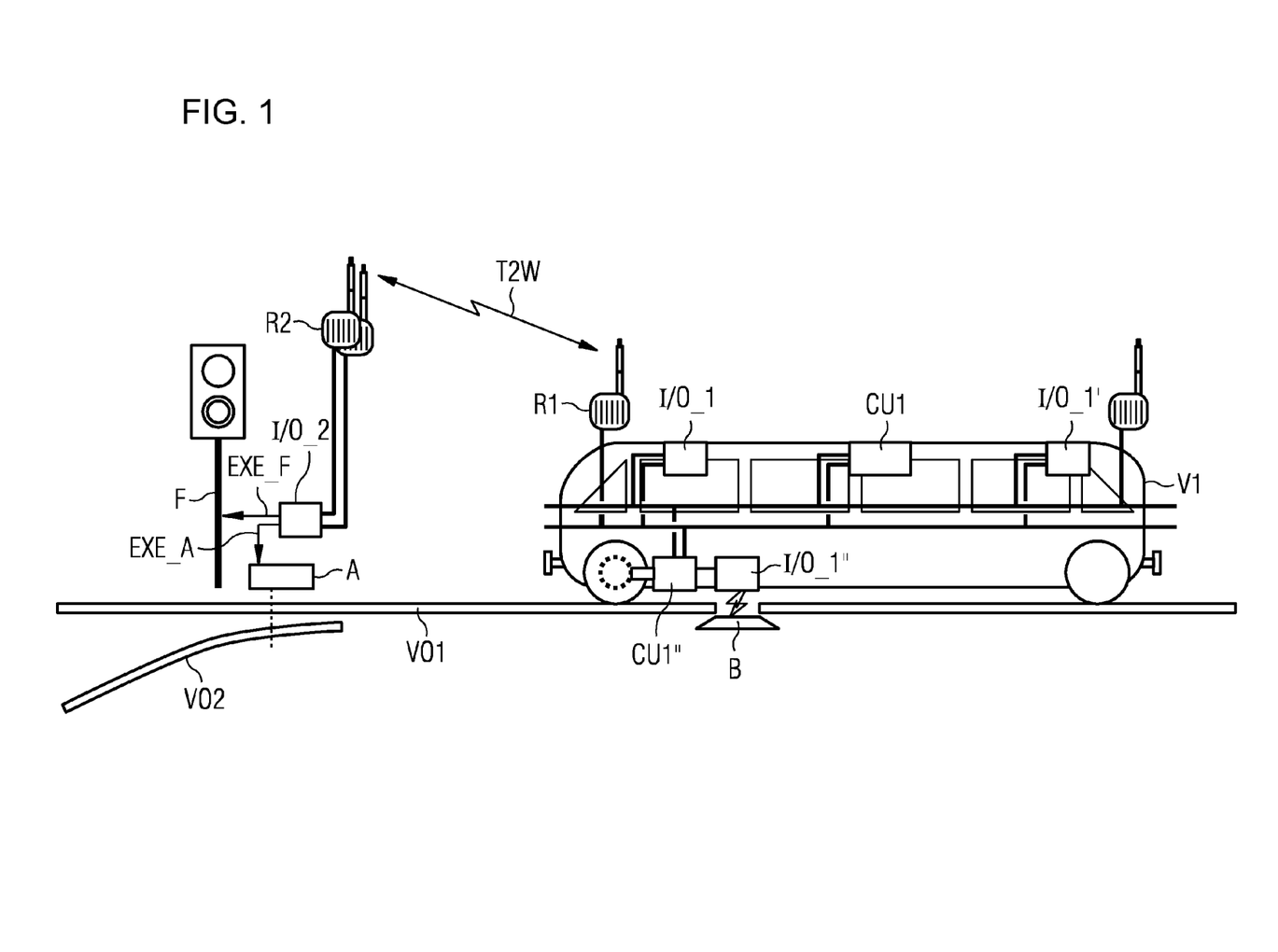
FIG. 1 Control of a switch, a signal light, a terminal using the method according to the invention, FIG. 2 Control of a switch and a light on the approach of two vehicles using the method according to the invention, FIG. 3 Control of vehicle and station platform doors using the method according to the invention, FIG. 4 Collision-prevention control between two vehicles using the method according to the invention.

FIG. 1 shows a typical implementation of control of a light F and a switch A to be interlocked to enable a vehicle V1 (train unit) to pass the light and to change the initial track VO1 thereof to a second track VO2 following interlocking and movement of the switch to the required position.

The vehicle includes on-board equipment comprising at least one control unit CU1 that is able to send information in the form of a command T2W, said command being sent from the control unit via a first on-board communication unit I/O_1, in this case radio R1, to a second communication unit I/O_2, in this case also radio R2, linked respectively to an execution module EXE_F, EXE_F executing the command received to control the light and the switch. In the method according to the invention, the control link between the on-board equipment and the two execution modules on the ground requires no communication link with other communication equipment on the ground, since the execution modules on the ground are directly controlled in slave mode governed by a master mode of the first control unit (CU1). Indeed, the master mode of the first control unit (CU1) itself independently obeys a secure traffic management protocol such as those imposed in the past by a central control station on the ground, managed by public transport operators and routines.

In the example in FIG. 1, another execution module of a railway terminal B can also be independently managed by a second control unit CU1" and the communication unit I/O_1" thereof, both being carried on board. Indeed, the control unit is directly aware of its own speed (using a speedometer, an odometer reading or any other measuring means) and can therefore provide the terminal with intrinsic information on the vehicle, such as speed, vehicle identification, diagnostics, energy state, traffic management plan, etc. in order to pass it on to the next vehicle to pass the terminal B. This assumes that the link between the communication unit I/O_1" and the terminal B is two-way and that the terminal is subject to both slave modes: recorder mode for information issued by the control unit and transmitter mode for reading the information stored. Thus, several trains can, redundantly with the individual default traffic plan thereof, automatically recalibrate themselves in response to global traffic management variations. Again, such one-off management by fixed terminals on the ground also requires no communication in the form of a ground communication network installed trackside and controlled centrally by a control station.

According to these different arrangements, other control routines or units, other possible adapted communication units can also be carried on-board vehicles, thereby enabling them, according to said method of the invention, to be simply upgradable as a function of expectations and advancement of the independent traffic management equipment.

Figure 2:
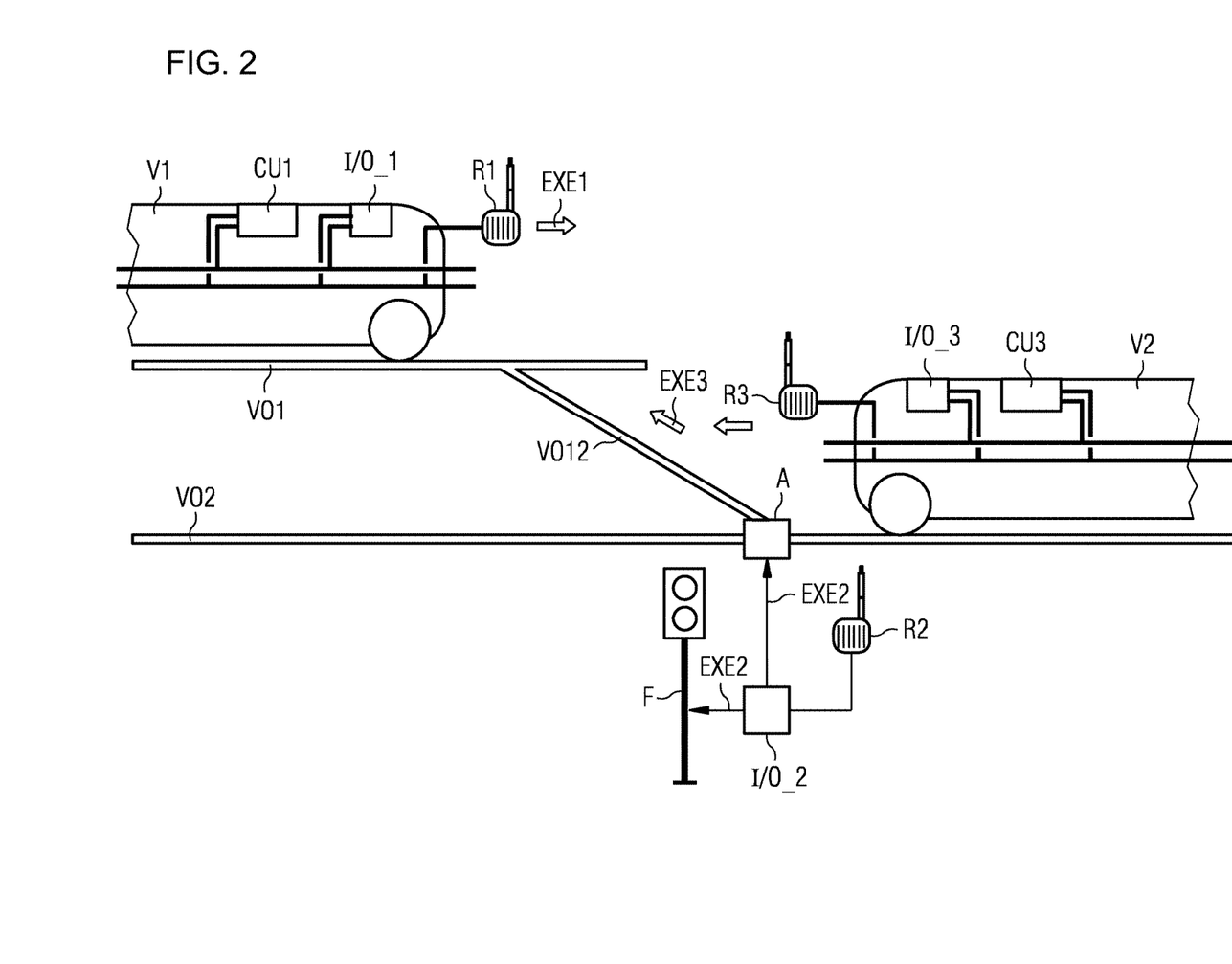

FIG. 2 shows an example of a command for a switch A and a light F at the approach of two vehicles V1, V2 for which the method according to the invention can be applied easily and very advantageously. Principally, the first vehicle V1, the switch A and the light F have the same features as in FIG. 1. The second vehicle V2 also includes, in the example of the first vehicle V1, on-board equipment such as a control unit CU3 linked to a communication unit I/O_3, and an execution unit EXE3 (symbolized by an arrow indicating the movement and direction of said vehicle).

Thus, to illustrate this example, it is assumed that the first vehicle V1 is moving towards the right on the first track VO1 thereof and the second vehicle V2 is arriving from the left on the track VO2 thereof, which is distinct from the first track VO1 and includes the light and the switch. The vehicle V2 wishes to pass from the second track VO2 thereof to the first track VO1 via a passable track portion VO12 dependent on the correct command EXE2 of the light F and the switch A.

A priori, according to this arrangement, the method according to the invention could ideally be implemented to prevent a collision between the two vehicles, in particular by minimizing the reaction time to the commands of the light, the switch and the train crossing.

The first vehicle V1 is assumed to have priority over the second vehicle V2 because, in a properly secured crossing approach zone, this second vehicle has to leave its own track to join the other track. Equally, the light has priority over the switch.

In other words, when the first vehicle V1 is passing through the crossing zone, it switches to master mode to command the light F into slave mode (mandatory traffic stop). The second vehicle V2 arrives at the light and must obey it as long as the first priority vehicle V1 is imposing its master mode on the light F, even if the second vehicle has already imposed its master mode on the switch A, in slave mode. Once the first vehicle V1 has passed the intersection of its own track VO1 with the intermediate crossing track VO12, it then inhibits its own master mode on the light F, which switches to authorize passing of said light. The second vehicle V2 can then move on to the intermediate crossing track VO12. A third possible implementation of the method according to the invention involves the first vehicle V1 switching to a master mode in connection with a slave mode of the second vehicle, to prevent any movement order EXE3 therein until the first vehicle V1 has completely passed the intersection of its own track VO1 with the intermediate track VO12. This last application of the method according to the invention is clearly redundant, but could be used to prevent vehicle collisions on the crossings in the event of failure of the lights.

All these stages described that obey two or three grouped applications of the method according to the invention are therefore performed without a command or authorization from a central control station on the ground or management equipment in equipment rooms. Only local on-board and ground equipment governs a train crossing with a secure change of track.

Another example could be if the first vehicle is stopped beforehand, then passes the intersection of its own track VO1 and the intermediate track VO12 and the control unit thereof or at least the master-mode command thereof to the light F in slave mode generates a fault and permanently fixes the light in a position preventing the second vehicle from passing, which by priority locks the light on the switch and securely locks the switch A in a closed position (the second vehicle V2 being forced to remain on its own track VO2). The second vehicle V2, remotely detecting the presence and a diagnosable fault of the first vehicle V1 which has temporary priority over it and is therefore master in terms of a movement command EXE3, then implements a movement command information return transmission from the control unit CU3 thereof to the first vehicle V1 and requires this latter to switch from the master mode thereof to a slave mode by forcing the execution module EXE1 thereof to run on the first track VO1 at least to ensure that it has to pass the intersection and therefore clear the passage of the second vehicle V2 on the first track V1. Moreover, the second vehicle, having returned to the master mode initially allocated to the first vehicle, also sends a status change command of the light F locked to authorize it to pass and therefore to release the switch. The second vehicle is therefore temporarily master in terms of several command modes regarding equipment on board the first vehicle V1 and on the ground A, F.

Again in this case, a crossing situation handicapped by a fault of a vehicle can be governed without using communication means on the ground in addition to the communication means in the on-board equipment and the signaling/steering equipment of the vehicles on the ground.

Figure 3:
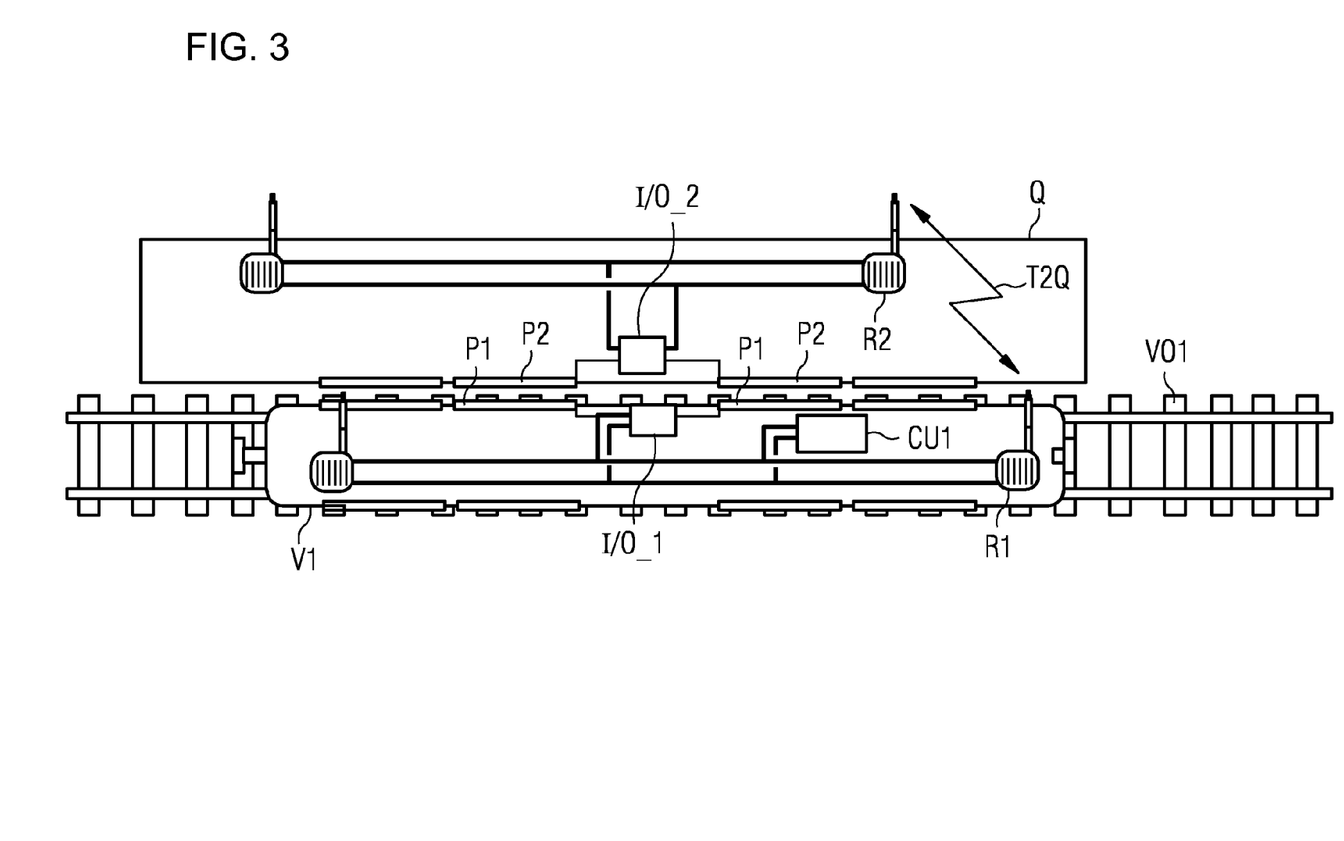

FIG. 3 shows an advantageous application of the method according to the invention in the event of control by a vehicle V1 arriving at a station platform Q, the vehicle and the platform having respectively a set of doors in which the opening and closing mechanisms are required to follow a spatial and temporal plan that is precise and secure for passengers. In this example, it is the control unit CU1 of the vehicle V1 at the platform that, by sending command information T2Q, imposes its own master mode on the entire execution module in slave mode, such as the opening PLC of each of the two sets of doors (on-board and platform). Thus, a temporary loss of opening/closing synchronization and an alignment error of the opening edges of the sets of doors are advantageously avoided. Thus, the execution PLC for opening the set of platform doors P2 can be enslaved to the execution PLC for opening the set of on-board doors P1. Equally, the signal triggering opening of the two sets of doors can also be sent by the only on-board control unit CU1, once it has received (from an end-of-platform approach execution module, also controlled in a slave mode) a tolerated relative positioning signal of the vehicle in relation to the platform. In other words, no source of "intelligent" commands is positioned on the platform, but is built into the on-board equipment.

Figure 4:
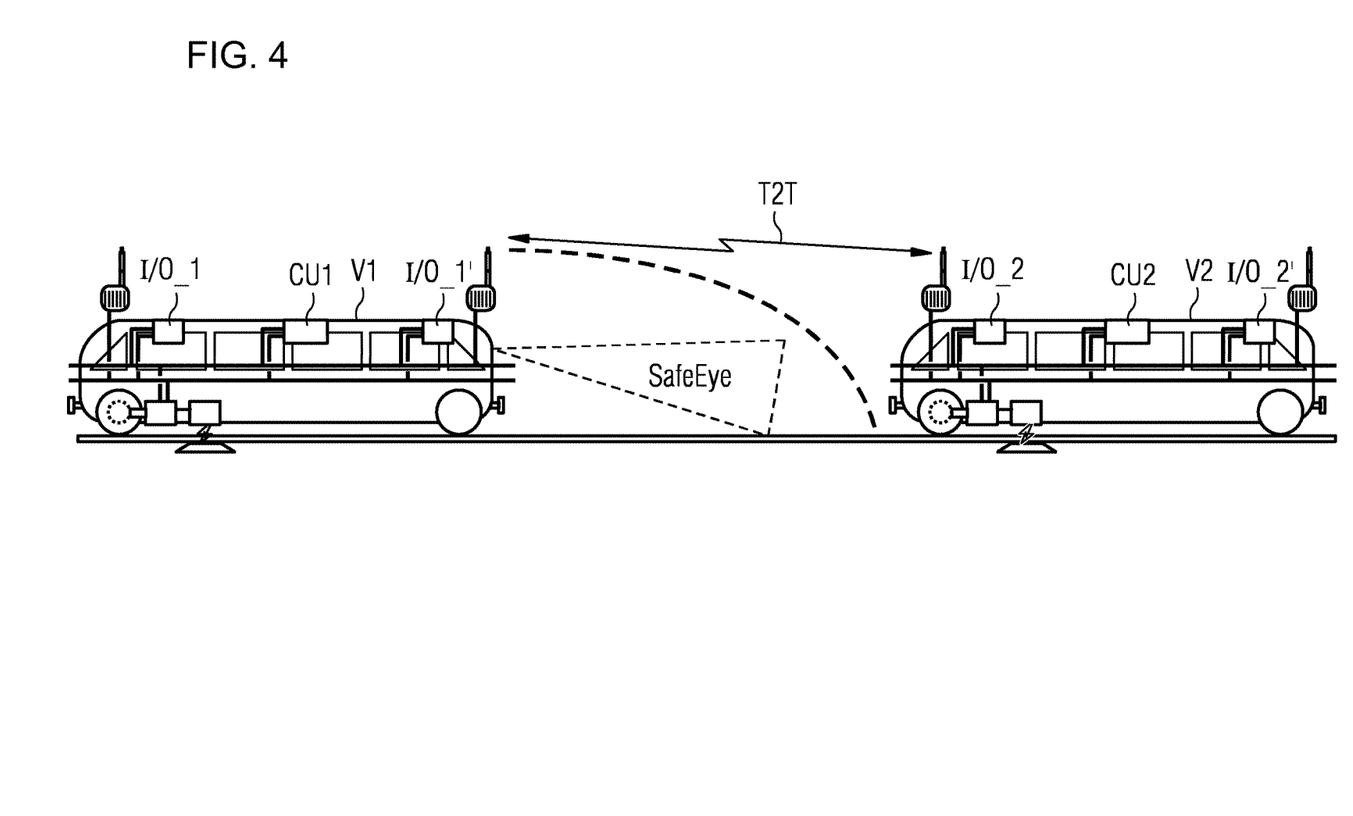

FIG. 4 shows an advantageous application of collision-prevention control between two vehicles V1, V2 on a single track using the method according to the invention. The same idea can be deduced for an approach, coupling or splitting of vehicle (train) units. Again, the control unit CU1 of the first vehicle V1 sends, in master mode, a radio command datum T2T directly to a movement execution module of the second vehicle V2 in slave mode to inhibit or start an approach movement order of the first vehicle in the case of a coupling, having first received from another "SafeEye" execution unit (such as an inter-vehicle distance sensor) in command slave mode and on board the first vehicle V1 an approach or stop authorization. Alternatively or additionally, the master/slave modes may be periodically inverted such as to ensure a doubly secure performance of a coupling procedure, for example. Thus, collision-prevention control between vehicles or trains can be ensured permanently independently and simply, without the need for any external control on the ground by a central station linked with the entire physical public transport network.

Finally, according to a preferred embodiment of the method according to the invention, the communication units of the different on-board and ground equipment are fitted with radio modules with interference-free signal transmission modes, ideally enabling instant identification of two devices within a defined area. Thus, the communication of information between different devices can be more selective, rapid and permanently updated as a function of a list of pairs of devices that can be associated in master/slave modes and classified according to variable independent secure traffic plan priorities.

The invention claimed is:

1. A method for communicating at least one item of information between a first control unit on-board a first vehicle and a public transport network, the method comprising:
   sending the information as a command from the first control unit to a first communication unit on board the first vehicle;
   establishing with the first communication unit, a transmission link outside the vehicle with a second communication unit connected to an execution module for executing the command, wherein the second communication unit and the execution module are located on the ground; and
   with the first control unit, controlling the execution module on the ground in a directly governed slave mode for the command by a master mode of the first control unit.

2. The method according to claim 1, which comprises switching a second control unit, which is on-board a second vehicle, from a slave mode to a master mode.

3. The method according to claim 2, which comprises alternatively controlling an execution module on board the first vehicle in a switched-back slave mode governed for the command by the master mode of the second control unit, thereby at least temporarily placing the first control unit on board the first vehicle in a slave mode to execute the command.

4. The method according to claim 1, wherein, in the event of a transmission to the second communication unit on the ground, the command governs at least one of the following actions:
   opening platform doors;
   a switch interlock;
   a switch movement;
   a ground signal;

storage of instantaneous information transmitted by the first vehicle in a communication terminal on the ground;
a diagnostic transmission to request a service on the ground;
sending an alert signal;
a functional status message for the first control unit on-board the first vehicle; and
a functional status message for second communication unit and the execution module located on the ground.

5. The method according to claim 4, wherein the command causes the opening of the platform doors in synchronicity with the vehicle doors.

6. The method according to claim 4, wherein the command causes the storage of instantaneous information to be readable by all vehicles approaching the terminal.

7. The method according to claim 4, wherein the command causes the diagnostic transmission to request a service selected from the group consisting of a power supply, a maintenance stage, and an emergency.

8. The method according to claim 1, wherein, in the event of a transmission to another on-board communication unit, the command governs at least one of the following actions:
a CBTC, ATC, IXL, ATP, ATO information exchange;
an information exchange enabling a driver to drive the second vehicle manually,
an independent movement authority of the first and second vehicle;
a preventive collision-prevention instruction;
a vehicle approach or coupling instruction;
a splitting instruction for a vehicle comprising a plurality of rolling-stock units;
an inter-vehicle information transmission for each vehicle using various parameters;
a forced protective switching from master mode to slave mode of one of the control units found to contravene safety standards, the other on-board control unit being set to a master mode to remote control the equipment on board the vehicle including the control unit in slave mode;
a forced protective switching from master mode to slave mode of one of the control units found to contravene safety standards, and the remote control of the equipment on board the vehicle including the control unit in slave mode from a ground network pilot.

9. The method according to claim 8, wherein the information exchange is suited to self-guided vehicles.

10. The method according to claim 8, wherein the various parameters are selected from the group consisting of position, speed, energy levels, braking capacity, instantaneous and anticipated routes.

11. The method according to claim 1, which comprises authorizing with at least one of the vehicles a switching of a control unit on the ground to master mode in order to send parameters related to the network, resources, planning and public transport equipment to an on-board control unit.

12. The method according to claim 1, which comprises employing radio links for information communication between equipment on a first vehicle and ground or on-board equipment remote from the first vehicle.

13. The method according to claim 1, which further comprises:

sending an additional command from the first control unit to a first communication unit on board the first vehicle;
establishing with the first communication unit, a transmission link outside the vehicle with another communication unit connected to an execution module for executing the additional command, wherein the other communication unit and the execution module for executing the command are located on board a second vehicle having a second control unit; and
controlling the execution module for executing the additional command on board the second vehicle in a governed slave mode to permit the additional command to be executed in a master mode of the first control unit, thereby at least temporarily placing the second control unit on board the second vehicle in a slave mode to execute the additional command.

14. The method according to claim 1, wherein the execution module is a programmable logic controller.

15. A method of installing, updating or commissioning a physical public transport network and a related communications network, the method which comprises:
sending information as a command from a first control unit on-board a first vehicle to a first communication unit on board the first vehicle in order to install, update, or commission the physical public transport network and the related communications network;
establishing with the first communication unit, a transmission link outside the vehicle with a second communication unit connected to an execution module for executing the command, wherein the second communication unit and the module for executing the command are located on the ground; and
with the first control unit, controlling the execution module for executing the command on the ground in a directly governed slave mode for the command by a master mode of the first control unit.

16. The method according to claim 15, which comprises maximizing, in a first phase, an initial supply of data that can be stored in on-board control modules of vehicles in order, in a second phase, to minimize a quantity of data transmission means, information and commands from communication infrastructure on the ground to the vehicles, the data thus stored and carried on board being used to generate the information in the form of commands.

17. The method according to claim 15, which comprises, at least under security conditions confirmed from on-board equipment, without transmitting data, information or commands from the communication infrastructure on the ground to the on-board equipment.

18. The method according to claim 15, which comprises: providing the first vehicle with on-board sensory equipment; and providing the data used to generate the information in the form of commands, identical and additional to the data stored and carried on board, by the on-board sensory equipment.

19. The method according to claim 18, wherein the on-board sensory equipment is selected from the group consisting of an optical sensor, a camera, a distance measurement sensor, and an RFID reader.

20. The method according to claim 15, wherein the execution module is a programmable logic controller.

* * * * *